E. W. MANLEY.
WHEEL BEARING.
APPLICATION FILED SEPT. 9, 1912.
1,070,709.
Patented Aug. 19, 1913.
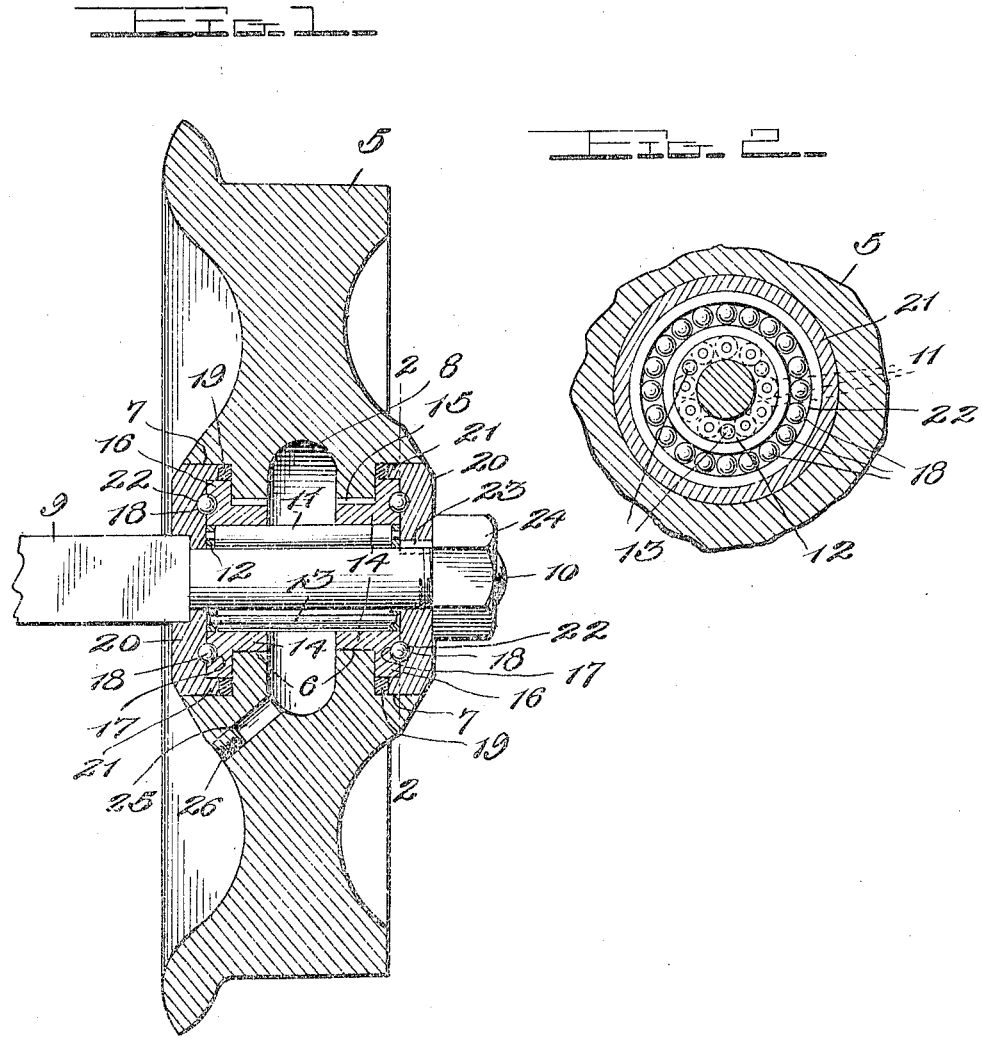

UNITED STATES PATENT OFFICE.

EARL W. MANLEY, OF CLINT, TEXAS.

WHEEL-BEARING.

1,070,709.

Specification of Letters Patent.   Patented Aug. 19, 1913.

Application filed September 9, 1912.   Serial No. 719,394.

*To all whom it may concern:*

Be it known that I, EARL W. MANLEY, a citizen of the United States, residing at Clint, in the county of El Paso and State of Texas, have invented certain new and useful Improvements in Wheel-Bearings, of which the following is a specification, reference being had to the accompanying drawings.

This invention relates to improvements in wheel bearings and has for its primary object to provide a novel device of this character consisting of comparatively few elements whereby friction between the wheel and its axle is reduced to a minimum and the entrance of dust to the interior of the bearing obviated.

Another object of the invention resides in the provision of longitudinal bearing rollers arranged upon the wheel axle, and improved means for retaining the bearing rollers in position in the bore of the wheel, said wheel being provided with a lubricant containing cavity opening into the bore of the wheel to supply the lubricant to said bearing rollers and to the axle.

A still further object of the invention is to provide a bearing of the above character consisting of very few parts which may be easily and quickly assembled in their operative positions, and are so constructed and arranged that the necessity of frequent repairs to the bearing will be practically eliminated.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a vertical section of a wheel provided with my improved bearing; and Fig. 2 is a section taken on the line 2—2 of Fig. 1.

Referring in detail to the drawing, 5 designates the wheel which in the illustrated embodiment of the invention is cast in one piece and is illustrative of that type of wheel commonly used upon mine cars. This wheel is provided with a central axle receiving bore 6 which is diametrically enlarged at its ends as indicated at 7. The wheel is further provided with a central annular chamber 8 which is adapted to contain a heavy oil or other suitable lubricant.

9 designates the axle, the body of which is of rectangular form, the end of the axle being provided with a reduced cylindrical spindle 10. Upon the spindle of the axle the longitudinally extending bearing rollers 11 are adapted to be arranged, said rollers contacting with the periphery of the axle spindle. The ends of these rollers are reduced and rotatably mounted in the cage rings 12. These cage rings are connected by means of a plurality of longitudinal rods 13. In the bore of the wheel the bushings 14 are adapted to be fitted, said bushings being provided with keys 15 for engagement in longitudinal keyways formed in the car wheel. The bushings 14 at one of their ends are provided with annular flanges 16 which extend into the enlarged ends 7 of the wheel bore 6. The inner ends of these bushings are disposed in the plane of the opposed walls of the lubricant receiving chamber 8. The outer faces of the flanges 16 are each provided with an annular race-way 17 to receive the balls 18. It will be noted that the flanges 16 are of less diameter than the diameter of the enlarged ends of the bore 6 of the wheel. Between the peripheries of the flanges 16 and the annular walls of the enlargements 7 of the wheel bore, the annular washers 19 of felt or other fibrous material are disposed. These washers are of less thickness than the thickness of the flanges 16.

Cap plates 20 are arranged upon the axle at the outer and inner ends of the bearing and are provided at their edges with annular flanges 21 for disposition between the flanges 16 of the bushings 14 and the wall of the enlarged ends of the bore 6. These flanges engage with the packing rings or washers 19 and compress the same, thus excluding dust and dirt from the interior of the bearing and providing a secure closure at the ends thereof to prevent leakage of the lubricant. The inner faces of the cap plates 20 are also provided with annular race-ways 22 which are opposed to the race-ways 17 of the bushings 14 and receive the bearing balls 18. The axle spindle 10 and the outer end cap plate 20 are provided with key-ways to receive a key 23 whereby said cap plate is fixed upon the axle and prevented from rotating with the wheel 5. The extremity of the axle spindle 10 is reduced and provided with screw threads to receive a nut 24 which engages the outer face of the plate 20 and forces the flange 21 thereof against the packing ring 19. The inner cap plate 20 has its central opening enlarged at one end and rectangularly formed to receive the end of the body of the axle 9, whereby said inner cap plate will be held against rotation.

In assembling the parts of the device, the inner cap plate 20 is first arranged upon the axle. The longitudinal bearing rollers 11 are then placed in position and after the bushings 14 have been inserted in the bore of the wheel, said wheel is inserted over the axle spindle and the bearing rollers, it being understood that the ball bearings 18 have been properly arranged in the raceways 22 of the cap plate. The outer series of balls 18 are now arranged in position and the outer cap plate 20 arranged upon the axle spindle and secured in position by means of the nut 24, so that the wheel and the bushings 14 keyed thereto may freely rotate upon the cap plates and between the series of longitudinal rollers 11. The chamber 8 of the wheel is supplied with the lubricant through an opening 25 the outer end of which is adapted to be closed by a threaded plug 26.

From the foregoing it is thought that the construction and manner of assembling the various elements of the bearing will be clearly understood.

By means of the invention, friction will be practically eliminated and dust and dirt excluded from the interior of the bearing. The lubricant is constantly supplied to the axle spindle in the rotation of the roller bearings 11, thus maintaining the wheel in easy running and serviceable condition.

It will of course be apparent that while I have illustrated the invention as applied to the ordinary mine car wheel, the device may be also utilized in vehicle wheels of various forms without necessitating any material alterations in the construction or arrangements of the several parts.

It will also be obvious that the invention is susceptible of considerable modification in the form, proportions and construction of the various parts without departing from the essential features or sacrificing any of the advantages thereof.

Having thus described the invention, what is claimed is:

1. The combination with the wheel having a bore enlarged at its ends and provided with an annular chamber opening into said bore, of a bearing for said wheel comprising a plurality of longitudinal rollers adapted to be arranged upon the wheel supporting axle, bushings fitted into the opposite ends of the bore and provided with annular flanges extending into the enlarged ends thereof, packing rings arranged between said flanges and the annular wall of the enlarged ends of the bore, cap plates fitted upon said axle and provided with flanges overlapping the flanges of said bushings and engaging with said packing rings, and bearing balls arranged between said cap plates and the flanges of the bushings.

2. The combination with the wheel having a bore enlarged at its ends and provided with a central annular chamber communicating with said bore, of a bearing comprising parallel longitudinal rollers adapted to be arranged upon the wheel axle to receive lubricant supplied to the chamber and distribute the same upon said axle, bushings adapted to be fitted into opposite ends of the bore and extending over the ends of said rollers, said bushings having annular flanges on one of their ends extending into the enlarged ends of the bore, cap plates adapted to be arranged upon the axle and provided with annular flanges overlapping the flanges of the bushings and disposed between the same and the annular wall of the bore enlargements, and bearing balls arranged between each of the cap plates and the flanges of said bushings.

3. The combination with the wheel having a bore enlarged at its ends and provided with a central annular chamber, of a bearing comprising a plurality of longitudinal rollers for engagement with the periphery of the wheel axle, bushings adapted to be fitted into opposite ends of the bore and keyed to the wheel, said bushings extending over the ends of the longitudinal rollers, said rollers receiving a lubricant from the chamber of the wheel to supply the same to the wheel axle and to said bushings, said bushings being provided upon one of their ends with annular flanges extending into the enlarged ends of the bore, packing rings arranged between said flanges and the annular walls of the bore enlargements, and cap plates adapted to be removably fixed upon the wheel axle and provided with flanges extending between the flanges of the bushings and the annular walls of the bore enlargements and engaging said packing ring.

In testimony whereof I hereunto affix my signature in the presence of two witnesses.

EARL W. MANLEY.

Witnesses:
SAM H. SPARROW,
THOS. H. WILLIAMSON.